United States Patent
Hwang et al.

(10) Patent No.: US 9,833,868 B2
(45) Date of Patent: Dec. 5, 2017

(54) CHATTER AVOIDANCE METHOD AND DEVICE

(71) Applicant: INDUSTRIAL TECHNOLOGY RESEARCH INSTITUTE, Hsinchu Hsien (TW)

(72) Inventors: Tsung-Ling Hwang, Hsinchu (TW); Chin-Te Lin, Taoyuan County (TW); Shuo-Peng Liang, Hsinchu (TW); Ta-Jen Peng, Hsinchu (TW); Jen-Ji Wang, Hsinchu (TW); Tzuo-Liang Luo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 237 days.

(21) Appl. No.: 14/971,438

(22) Filed: Dec. 16, 2015

(65) Prior Publication Data

US 2017/0100810 A1 Apr. 13, 2017

(30) Foreign Application Priority Data

Oct. 7, 2015 (TW) .............................. 104133003 A

(51) Int. Cl.
*B23Q 17/09* (2006.01)
*G05B 19/404* (2006.01)

(52) U.S. Cl.
CPC ....... *B23Q 17/0976* (2013.01); *G05B 19/404* (2013.01); *G05B 2219/31407* (2013.01);
(Continued)

(58) Field of Classification Search
CPC .............. B23Q 17/0976; G05B 19/404; G05B 2219/31407; G05B 2219/41115; G05B 2219/49075; G05B 2219/41256
(Continued)

(56) References Cited

U.S. PATENT DOCUMENTS 5,170,358 A 12/1992 Delio
6,189,426 B1 2/2001 Segalman et al.
(Continued)

FOREIGN PATENT DOCUMENTS

CN 103252680 A 8/2013
CN 104076733 A 10/2014
(Continued)

OTHER PUBLICATIONS

Landers et al., Process Monitoring and Control of Machining Operations; Thesis; 2002; pp. 1-36.
(Continued)

*Primary Examiner* — Sean Shechtman
*Assistant Examiner* — Michael W Choi
(74) *Attorney, Agent, or Firm* — Rabin & Berdo, P.C.

(57) ABSTRACT

A chatter avoidance method and device is provided, including steps of: providing a stable operating condition plot; partially removing a first layer of a workpiece with a predetermined first removal depth according to a safe removal depth of the stable operating condition plot and sensing a chatter caused by the removal operation; if no chatter is sensed, completing the removal operation, otherwise, continuing to partially remove the first layer with a second removal depth less than the predetermined first removal depth; and determining a minimum removal depth according to the removal operation, and removing a last layer of the workpiece with a last removal depth less than or equal to the minimum removal depth, allowing the workpiece to have a target thickness. The disclosure prevents a chatter from continuously occurring without requiring a shut-down and thereby maintains a desired production rate.

20 Claims, 5 Drawing Sheets

(52) U.S. Cl.
CPC ............... *G05B 2219/41115* (2013.01); *G05B 2219/41256* (2013.01); *G05B 2219/49075* (2013.01)

(58) Field of Classification Search
USPC ....................................................... 700/159
See application file for complete search history.

(56) References Cited

U.S. PATENT DOCUMENTS

| | | |
|---|---|---|
| 8,131,525 B2 | 3/2012 | Schmitz et al. |
| 8,229,598 B2 | 7/2012 | Suzuki et al. |
| 2006/0188351 A1* | 8/2006 | Wang ................. B23Q 17/0976 409/141 |
| 2008/0105094 A1 | 5/2008 | McMurtry et al. |
| 2010/0104388 A1 | 4/2010 | Suzuki et al. |
| 2011/0081216 A1* | 4/2011 | Ogura .................... B23Q 1/265 409/141 |
| 2012/0010744 A1 | 1/2012 | Yamashita et al. |
| 2012/0101624 A1* | 4/2012 | Ueno ................. B23Q 17/0976 700/173 |
| 2012/0232812 A1 | 9/2012 | Okita et al. |
| 2013/0164092 A1* | 6/2013 | Kondo ................. G05B 19/404 409/132 |
| 2016/0297044 A1* | 10/2016 | Dunkin .............. B23Q 17/0976 |

FOREIGN PATENT DOCUMENTS

| | | |
|---|---|---|
| JP | 2013027944 A | 2/2013 |
| TW | 200626297 A | 8/2006 |
| TW | M3855422 U | 8/2010 |

OTHER PUBLICATIONS

Bukak, An Analytical Design Method for Milling Cutters With Nonconstant Pitch to Increase Stability, Part 2: Application; Journal of Manufacturing Science and Engineering; 2003; vol. 125, pp. 35-38.

Ganguli, Chatter reduction through active vibraton damping; Thesis; 2003; pp. 1-102.

Wang et al., Chatter detection based on probability distribution of wavelet modulus maxima; Robotics and Computer-Integrated Manufacturing; 2009; vol. 25, pp. 989-998.

Klocke et al., Process Monitoring and Control of Machining Operation; Int. J of Automation Technology; 2011; vol. 5 No. 3, pp. 403-411.

Gietzelt et al., Mechanical Micromachining by Drilling, Milling and Slotting; Micromachining Techniques for Fabrication of Micro and nano Sructures; 2012; Ch8, pp. 159-183.

Daghini, Improving Machining System Performance through Designed-in Damping Modelling, Analysis and Design Solutions; Thesis; 2012; pp. 1-79.

Taiwan Patent Office, Office Action, Patent Application Serial No. TW104133003, dated Dec. 9, 2016, Taiwan.

Han et al., Chatter Suppression Technology Research in Numerical Control Machine Tool Turning Process, J. North China Univ. of. Tech, vol. 18, No. 1, Mar. 2006, pp. 1-6.

* cited by examiner

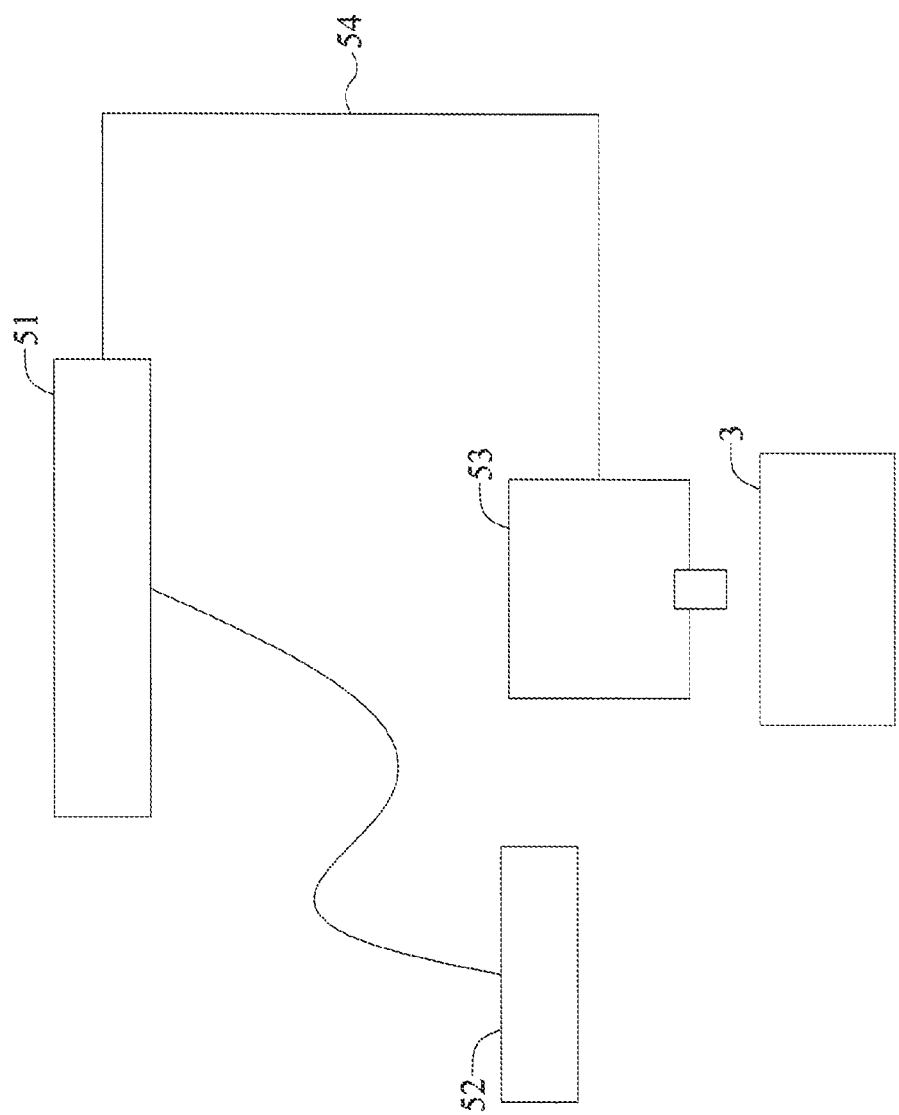

CHATTER AVOIDANCE METHOD AND DEVICE

CROSS-REFERENCE TO RELATED APPLICATION

The present disclosure is based on, and claims priority from, Taiwan Application Number 104133003, filed Oct. 7, 2015, the disclosure of which is hereby incorporated by reference herein in its entirety.

BACKGROUND

1. Technical Field

The present disclosure relates to a chatter avoidance method and device that can partially remove a workpiece with a reduced removal depth when a chatter is sensed.

2. Description of Related Art

Conventionally, a workpiece turns on a lathe with a certain removal depth at each stage so as to reduce the thickness. However, if a chatter occurs on the workpiece during the turning process, the workpiece will become defective. Even if a chatter avoidance method (for example, a method for adjusting the rotating speed of a machining shaft, fastening a fixture, changing a cutter, or changing the feeding speed of a cutter) is immediately applied to prevent the chatter from occurring continuously, the defect is still left on the workpiece. Further, when the method of adjusting the rotating speed of the machining shaft or the feeding speed of the cutter is applied, the cutter may be broken. Furthermore, in order to apply the method of fastening the fixture or changing the cutter, the lathe must be shut down, thus incurring a production delay.

Accordingly, there is a need to provide a chatter avoidance method and device so as to overcome the above-described drawbacks.

SUMMARY

The present disclosure provides a chatter avoidance method, which comprises steps of: providing a stable operating condition plot with a safe removal depth and a condition of a removal tool; performing a first part of a removal operation to partially remove a first layer of a workpiece with a predetermined first removal depth of the first layer according to the safe removal depth of the stable operating condition plot, and performing a sensing operation to sense a chatter caused by the removal operation; if no chatter is sensed, completing the removal operation, otherwise, continuing to partially remove the first layer of the workpiece with a second removal depth less than the predetermined first removal depth and sensing a chatter caused by the removal operation, and if a chatter is sensed again, reducing the second removal depth of the first layer and continuing the removal operation and the sensing operation until the first layer of the workpiece is completely removed; determining a minimum removal depth of the first layer according to the removal operation of the first layer; and removing a last layer of the workpiece with a last removal depth less than or equal to the minimum removal depth, allowing the workpiece to have a target thickness.

The present disclosure further provides a chatter avoidance device, which comprises: a removal unit configured to partially remove a workpiece; a sensing element configured to sense a chatter when the workpiece is partially removed; a control unit wiredly or wirelessly coupled to the removal unit and the sensing element, and configured to receive a chatter signal from the sensing element and control the removal unit according to the chatter signal. Further, according to a stable operating condition plot with a safe removal depth and a condition of a removal tool, the control unit is configured to perform steps of: subjecting the removal unit to perform a first part of a removal operation to partially remove a first layer of the workpiece with a predetermined first removal depth of the first layer according to the safe removal depth of the stable operating condition plot, and subjecting the sensing element to perform a sensing operation to sense a chatter caused by the removal operation; if no chatter is sensed, subjecting the removal unit to complete the removal operation, or if a chatter is sensed by the sensing operation of the sensing element, subjecting the removal unit to continue partially removing the first layer of the workpiece with a second removal depth less than the predetermined first removal depth of the first layer and subjecting the sensing element to sense a chatter caused by the removal operation, and if a chatter is sensed again, reducing the second removal depth of the first layer and subjecting the removal unit to continue the removal operation and the sensing operation until the first layer of the workpiece is completely removed; determining a minimum removal depth of the first layer according to the removal operation of the first layer, and subjecting the removal unit to remove a last layer of the workpiece with a last removal depth less than or equal to the minimum removal depth, allowing the workpiece to have a target thickness.

According to the chatter avoidance method and device of the present disclosure, when a chatter is sensed during partial removal of a workpiece, the removal depth is reduced to prevent the chatter from continuously occurring without requiring a shut-down. Further, the last layer of the workpiece is removed with a last removal depth that is less than or equal to the minimum removal depth of the previous layers so as to ensure that no chatter would occur and allow previous defects to be removed. Furthermore, the present disclosure limits the amount of reduction in the removal depth so as to avoid cutter breakage and maintain a desired removal rate and hence maintain a desired production rate.

BRIEF DESCRIPTION OF DRAWINGS

FIG. 5 is a schematic block diagram showing a chatter avoidance device according to the present disclosure.

DETAILED DESCRIPTION

The following illustrative embodiments are provided to illustrate the present disclosure. These and other advantages and effects can be apparent to those in the art after reading this specification. It should be noted that all the drawings are not intended to limit the present disclosure. Various modifications and variations can be made without departing from the spirit of the present disclosure.

Figure 1:
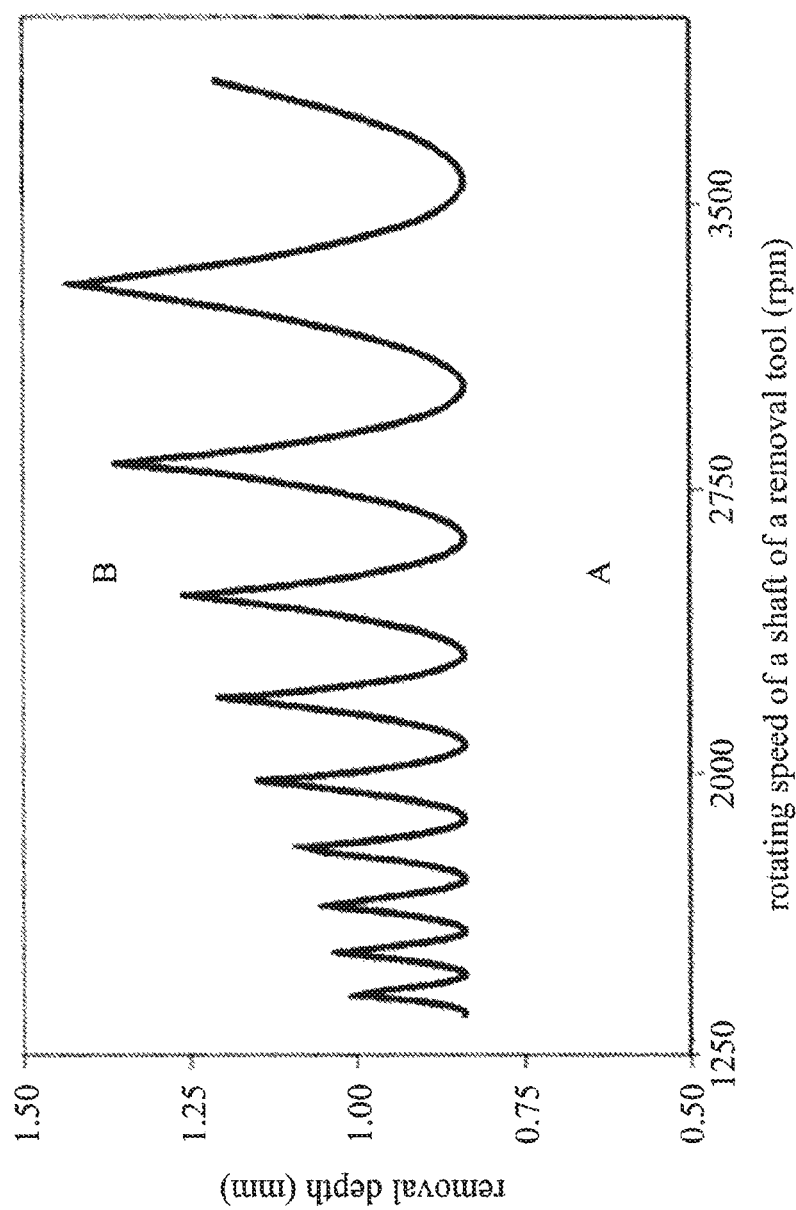
FIG. 1 is a stable operating condition plot with a removal depth versus a condition of a removal tool.

FIG. 1 is a stable operating condition plot with a removal depth versus a condition of a removal tool. The condition of the removal tool refers to the rotating speed of a shaft of the removal tool, the feeding speed and/or a condition of a cutter. In one embodiment, the condition of the removal tool refers to the rotating speed of the shaft of the removal tool. Referring to FIG. 1, a solid line of the plot represents a critical removal depth versus a condition of the removal tool where no chatter occurs. That is, if a workpiece is machined with a removal depth above the solid line, i.e., in a region B, a chatter will occur; on the other hand, if the workpiece is machined with a removal depth below the solid line, i.e., in a region A, no chatter occurs. However, in some cases, when the workpiece is machined with a removal depth that is positioned on or close to the solid line, a chatter may occur. Therefore, in addition to the stable operating condition plot, a chatter avoidance method and device is required to prevent a chatter from occurring continuously and eliminate defects caused by the chatter.

Figure 2:
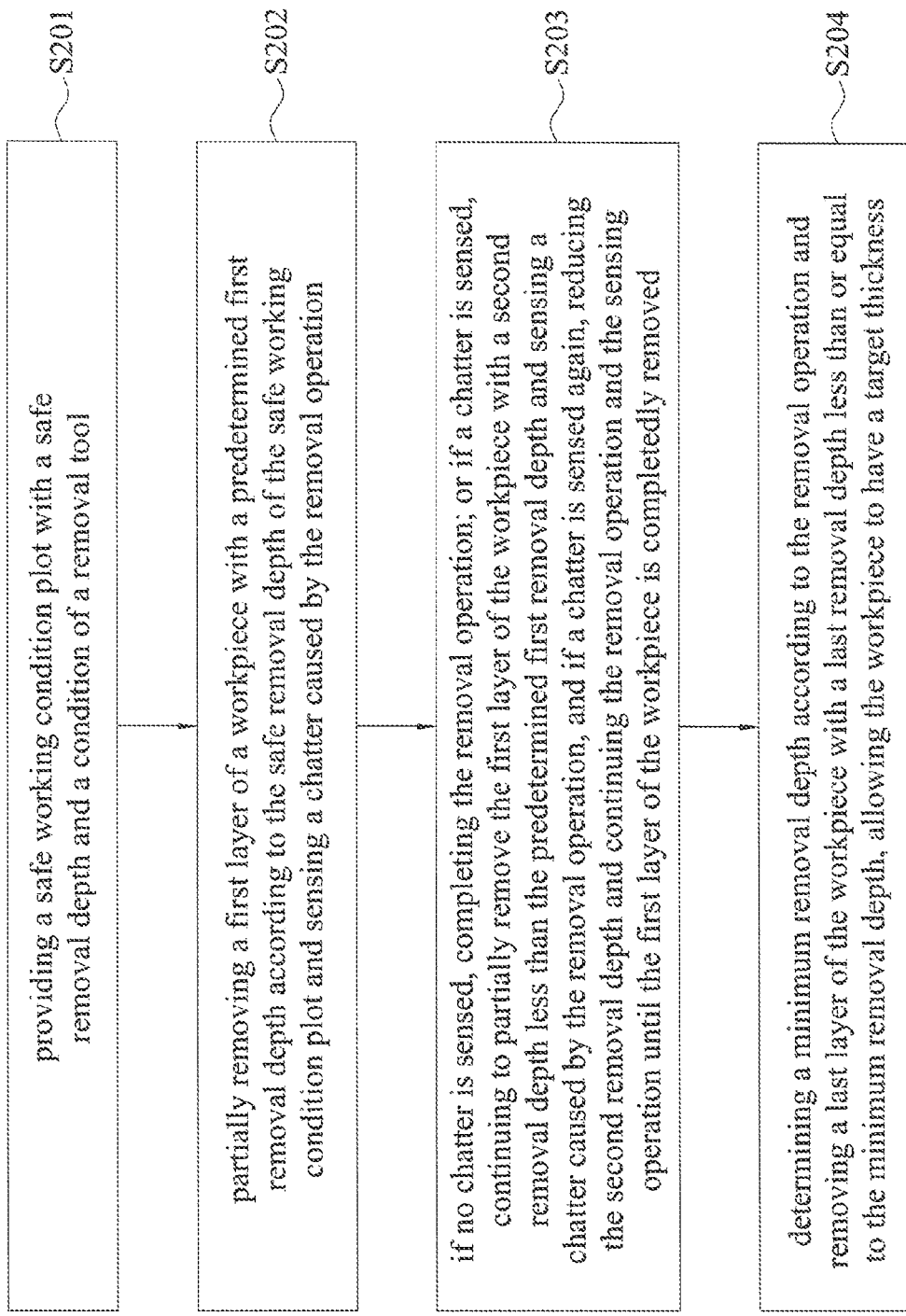
FIG. 2 is a schematic flow diagram showing a chatter avoidance method according to the present disclosure.

FIG. 2 is a schematic flow diagram showing a chatter avoidance method according to the present disclosure, and FIGS. 3A to 3D are schematic views showing different states of a workpiece when the workpiece is partially removed by using the method illustrated in FIG. 2. Referring to FIG. 2, at step S201, a stable operating condition plot with a safe removal depth and a condition of a removal tool is provided. Then, at step S202, according to the safe removal depth of the stable operating condition plot, a first layer of the workpiece (starting from a surface of the workpiece) is partially removed with a predetermined first removal depth, and at the same time a sensing operation is performed to sense a chatter caused by the removal operation. In one embodiment, according to the safe removal depth of the stable operating condition plot (i.e., the solid line and the region A below the solid line), a suitable safe removal depth is selected as the predetermined first removal depth of the first layer. The suitable safe removal depth can be any removal depth positioned on the solid line or in the region A close to the solid line corresponding to a rotating speed of the shaft. For example, if the rotating speed of the shaft is 2000 rpm, the predetermined first removal depth of the first layer can be in a range of from about 0.9 mm to 1.2 mm, thereby preventing a chatter from occurring and achieving short machining time. At this point, referring to FIG. 3A, the workpiece 3 is not machined yet. Then, referring to FIG. 3B, the first layer of the workpiece 3 is partially removed with the predetermined first removal depth 31 (starting from the surface of the workpiece 3), and at the same time, a sensing operation is performed to sense a chatter caused by the removal operation. Before the removal operation, it can be assumed that the removal operation with the safe removal depth will not cause a chatter, and therefore, the first removal depth can be predetermined for each layer of the workpiece 3 to be removed. For example, in addition to a last layer, the workpiece 3 has at least two layers to be removed.

Thereafter, at step S203, if no chatter is sensed, the removal operation is completed. Otherwise, if a chatter is sensed, the first layer of the workpiece is continuously removed with a second removal depth that is less than the first predetermined removal depth, and at the same time, a sensing operation is performed to sense a chatter caused by the removal operation. In one embodiment, referring to FIG. 3B, if a chatter occurs and a defect 311 is formed on the workpiece 3, the first layer of the workpiece 3 is partially removed with the second removal depth 32 less than the predetermined first removal depth 31, and at the same time, a sensing operation is performed to sense a chatter caused by the removal operation. If a chatter is sensed again, the removal depth is reduced again (for example, the first layer of the workpiece 3 is partially removed with a third removal depth that is less than the second removal depth 32), and the removal operation and the sensing operation are continued until removal of the first layer is completed. Further, if the workpiece 3 has at least two layers to be removed in addition to the last layer, the difference between the predetermined first removal depth 31 of the first layer and the second removal depth 32 of the first layer is required to be less than or equal to the sum of the predetermined first removal depth 31 of the first layer and the predetermined first removal depth of the second layer multiplied by 0.04, which is represented by the following expression (1):

(the predetermined first removal depth of the first layer−the second removal depth of the first layer)<(the predetermined first removal depth of the first layer+the predetermined first removal depth of the second layer)×0.04     (1)

If the difference between the predetermined first removal depth 31 of the first layer and the second removal depth 32 of the first layer is greater than the sum of the predetermined first removal depth 31 of the first layer and the predetermined first removal depth of the second layer multiplied by 0.04 and the workpiece 3 has at least two layers to be removed in addition to the last layer, removal of the first layer can be stopped and the process can directly go back to step S202 so as to re-design an operating path (i.e., the number of layers from the second layer to the next-to-the-last layer and/or the predetermined first removal depth) according to the stable operating condition plot and define the predetermined first removal depth of the second layer to be less than or equal to the second removal depth 32 of the first layer. Such an operation can avoid a chatter that is likely to occur during removal of the second layer due to a thick residue of the first layer. Then, referring to FIG. 3C, the second layer of the workpiece 3 is partially removed with the first removal depth 33 of the second layer that is less than or equal to the second removal depth 32 of the first layer (i.e., the first removal depth 33 of the second layer has been changed), and at the same time, a sensing operation is performed to sense a chatter caused by the removal operation. If a chatter occurs again and a defect 331 is formed on the workpiece 3, the second layer of the workpiece 3 is continuously removed with a second removal depth 34 that is less than the first removal depth 33, and at the same time, a sensing operation is performed to sense a chatter caused by the removal operation. Steps S202 and S203 are repeated for the second to Nth layers of the workpiece 3 (if provided).

Figure 3D:
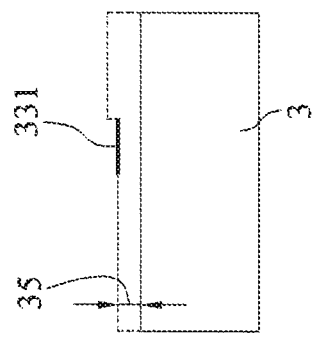
FIGS. 3A-3D are schematic views showing different states of a workpiece when the workpiece is partially removed by using the method illustrated in FIG. 2.
Figure 3C:
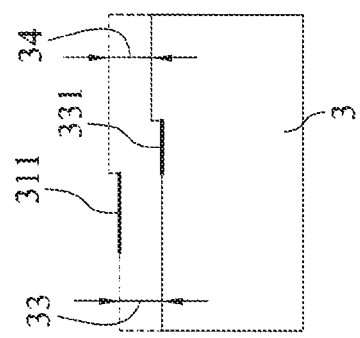
Figure 3B:
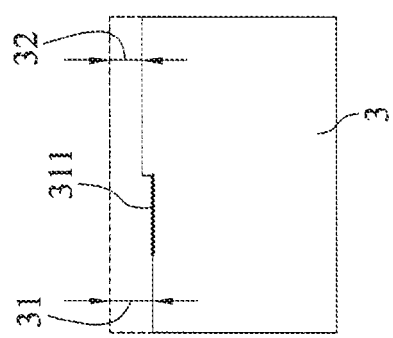
Figure 3A:
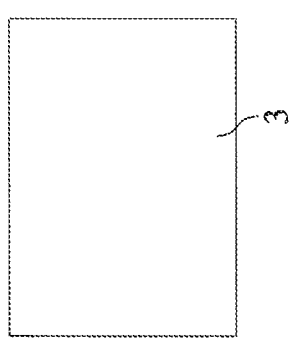

Finally, at step S204, referring to FIG. 3D, a minimum removal depth is determined according to the removal operations of step S203, and the last layer of the workpiece 3 is removed with a last removal depth 35 that is less than or equal to the minimum removal depth, so as to allow the workpiece 3 to have a target thickness. The last removal depth 35 can be 30% lower than the solid line corresponding to a rotating speed of the shaft. For example, if the rotating speed of the shaft is 2000 rpm, the last removal depth 35 can be lower than 3.6 mm so as to ensure no chatter occurs and eliminate the defects 311, 331.

In addition, if the predetermined number of layers of the workpiece 3 is not sufficient to achieve the target thickness of the workpiece 3 due to the change of the removal depth, the present disclosure allows the removal path, such as the removal depth and/or the number of layers, to be re-designed during the removal process of the workpiece 3, thereby achieving the target thickness of the workpiece 3. In one embodiment, the re-designing operation can be performed before starting removal of each layer of the workpiece 3.

Figure 4:
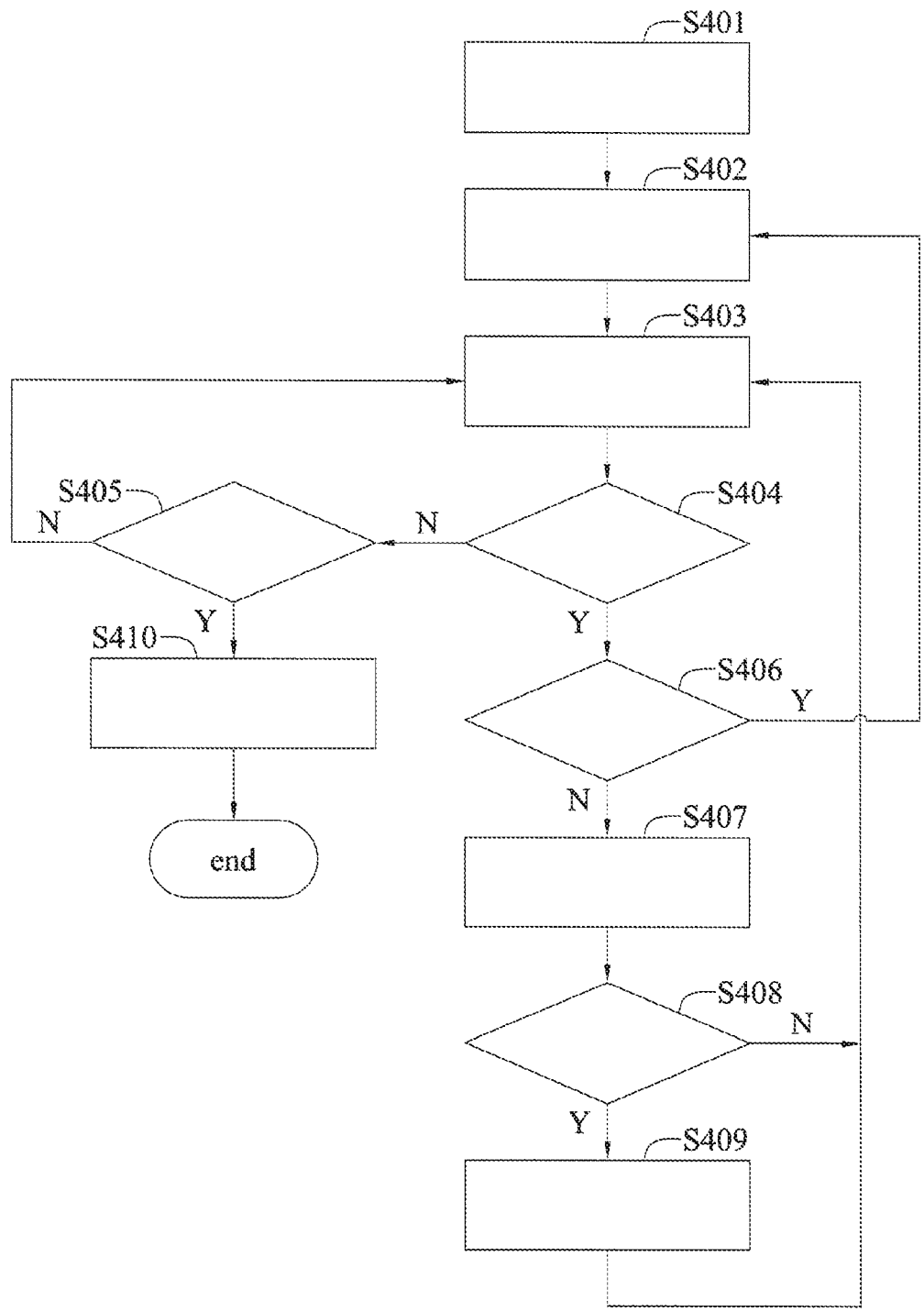
FIG. 4 is a schematic flow diagram showing a chatter avoidance method according to another embodiment of the present disclosure.

FIG. 4 is a schematic flow diagram showing a chatter avoidance method according to another embodiment of the present disclosure. Referring to FIG. 4, at step S401, a stable operating condition plot with a safe removal depth and a condition of a removal tool is provided. Then, at step S402, a predetermined first removal depth of a first layer is selected according to the safe removal depth of the stable operating condition plot.

Thereafter, at step S403, the first layer of the workpiece is partially removed with the predetermined first removal depth (starting from the surface of the workpiece), and at the same time, a sensing operation is performed to sense a chatter caused by the removal operation.

At step S404, whether a chatter is sensed is determined. If no chatter is sensed, the process goes to step S405 for determining whether a last layer of the workpiece is reached. If it is determined that the last layer of the workpiece is not reached, the process goes back to step S403 to perform removal of a second layer. If it is determined that the last layer of the workpiece is reached, the process goes to step S410. At step S410, a minimum removal depth is determined according to the removal operation of step S403 (if no chatter is sensed, the minimum removal depth is equal to the predetermined first removal depth of the first layer), and the last layer is removed with a last removal depth that is less than or equal to the minimum removal depth so as to allow the workpiece to have the target thickness and end the removal process.

If it is determined that a chatter is sensed and the workpiece has a second layer to be removed at step S404, the process goes to step S406 for determining whether a maximum amount of reduction in the removal depth is reached. That is, the result of subtracting the sum of the predetermined first removal depth of the first layer and the predetermined first removal depth of the second layer multiplied by 0.04 from the difference between the predetermined first removal depth of the first layer and the second removal depth of the first layer is determined, which is represented by the following expression (2):

$$\begin{aligned}&(\text{the predetermined first removal depth of the first}\\&\text{layer}-\text{the second removal depth of the first}\\&\text{layer})-(\text{the predetermined first removal depth of}\\&\text{the first layer}+\text{the predetermined first removal}\\&\text{depth of the second layer})\times 0.04\end{aligned} \quad (2)$$

If it is determined that the maximum amount of reduction in the removal depth is reached, i.e., the difference between the predetermined first removal depth of the first layer and the second removal depth of the first layer is greater than the sum of the predetermined first removal depth of the first layer and the predetermined first removal depth of the second layer multiplied by 0.04, removal of the first layer is stopped. Further, the process goes back to step S402 for re-designing the number of layers from the second layer to the next-to-the-last layer and the predetermined first removal depth according to the stable operating condition plot and defining the predetermined first removal depth of the second layer to be less than or equal to the second removal depth of the first layer so as to maintain a desired removal rate and avoid a chatter and cutter breakage that are otherwise likely to occur during removal of the second layer due to a thick residue of the first layer. Then, at step S403, removal of the second layer is performed. At this point, the second layer of the workpiece is partially removed with the first removal depth of the second layer that is less than or equal to the second removal depth of the first layer, and at the same time, a sensing operation is performed to sense a chatter caused by the removal operation.

Then, steps S403, S404, S405 and S410 are performed as described above. At step S410, a minimum removal depth is determined according to the removal operation of step S403 (if no chatter is sensed, the minimum removal depth is equal to the minimum value among the minimum removal depths of each layers). If a chatter is sensed, step S406 is performed. At this point, if it is determined that the difference between the predetermined first removal depth of the second layer and the second removal depth of the second layer is greater than the sum of the predetermined first removal depth of the second layer and the predetermined first removal depth of a third layer multiplied by 0.04, removal of the second layer is stopped. Further, the process goes back to step S402 for re-designing the number of layers from the third layer to the next-to-the-last layer and the predetermined first removal depth according to the stable operating condition plot and defining the predetermined first removal depth of the third layer to be less than or equal to the second removal depth of the second layer. Then, at step S403, removal of the third layer is performed.

At step S406, if it is determined that the maximum amount of reduction in the removal depth is not reached, i.e., the difference between the predetermined first removal depth of the first layer and the second removal depth of the first layer is less than or equal to the sum of the predetermined first removal depth of the first layer and the predetermined first removal depth of the second layer multiplied by 0.04, the process goes to step S407 for partially removing the first layer of the workpiece with the second removal depth that is less than the first predetermined removal depth of the first layer. Further, if the workpiece has at least two layers to be removed in addition to the last layer, the difference between the predetermined first removal depth of the first layer and the second removal depth of the first layer can be required to be less than or equal to the sum of the predetermined first removal depth of the first layer and the predetermined first removal depth of the second layer multiplied by 0.04, which is represented by expression (1). If a chatter occurs continuously, the removal depth can be continuously reduced so as to generate an Nth removal depth of the first layer corresponding to the minimum removal depth for partially removing the workpiece, and at the same time, a sensing operation is performed to sense a chatter caused by the removal operation. That is, when a chatter is sensed again, the removal depth is continuously reduced, and the first layer of the workpiece is partially removed with an Nth removal depth that is less than the second removal depth of the first layer, and at the same time, a sensing operation is performed to sense a chatter caused by the removal operation until removal of the first layer is completed.

At step S408, whether the maximum amount of reduction in the removal depth is reached is determined. That is, the result of subtracting the sum of the predetermined first removal depth of the first layer and the predetermined first removal depth of the second layer multiplied by 0.04 from the difference between the predetermined first removal depth of the first layer and the Nth removal depth of the first layer is determined. If the maximum amount of reduction in the removal depth is not reached, i.e., the difference between the predetermined first removal depth of the first layer and the Nth removal depth of the first layer is less than the sum of the predetermined first removal depth of the first layer and the predetermined first removal depth of the second layer multiplied by 0.04, the process goes back to step S403 for partially removing the workpiece with the Nth removal depth of the first layer, and at the same time, sensing a chatter caused by the removal operation. If no chatter is sensed, the workpiece is partially removed with the Nth removal depth until removal of the next-to-the-last layer of the workpiece is completed. When the workpiece is partially removed with the Nth removal depth and a sensing operation is performed, steps S403, S404, S406, S407 and S408, or steps S403, S404, S406 and S402, or steps S403, S404, S405, S403 can be repeated until step S410 is reached.

At step S408, if it is determined that the maximum amount of reduction in the removal depth is reached, i.e., the difference between the predetermined first removal depth of the first layer and the Nth removal depth of the first layer is greater than or equal to the sum of the predetermined first removal depth of the first layer and the predetermined first removal depth of the second layer multiplied by 0.04, the process goes to step S409 for partially removing the workpiece with a maximum removal depth. That is, the difference between the predetermined first removal depth of the first layer and the sum of the predetermined first removal depth of the first layer and the predetermined first removal depth of the second layer multiplied by 0.04 is defined as a temporary removal depth, which is represented by the following expression (3):

the predetermined first removal depth of the first layer−(the predetermined first removal depth of the first layer+the predetermined first removal depth of the second layer)×0.04=the temporary removal depth       (3)

The workpiece is partially removed with the temporary removal depth, and at the same time, a sensing operation is performed to sense a chatter caused by the removal operation. When the workpiece is partially removed with the temporary removal depth and a sensing operation is performed, steps S403, S404, S406, S407, S408 and S409, or steps S403, S404, S406 and S402, or steps S403, S404, S406, S407, S408 and S403 can be repeated.

FIG. 5 is a schematic block diagram showing a chatter avoidance device 5 according to the present disclosure. Referring to FIG. 5, the chatter avoidance device 5 has a sensing element 52 for sensing a chatter when a workpiece 3 is partially removed, a removal unit 53 for partially removing the workpiece 3, a control unit 51 wiredly or wirelessly coupled to the sensing element 52 and the removal unit 53 for receiving a chatter signal from the sensing element and controlling the removal unit according to the chatter signal.

According to a stable operating condition plot of a safe removal depth and a condition of a removal tool, the control unit 51 controls the removal unit 53 to partially remove the workpiece 3.

The sensing element 52 can be an accelerometer, a monitor or an acoustic sensor. In one embodiment, the sensing element 52 is an acoustic sensor for continuously sensing a chatter.

The removal unit 53 can be a lathe, a milling machine or a drilling machine.

The control unit 51 is coupled to the sensing element 52 and the removal unit 53 through a signal line 54 or in a wireless manner. The control unit 51 can be a central processing unit or a microcontroller coupled to a storage device (such as an optical disk drive, a hard disk drive, a floppy disk drive or a USB drive). Alternatively, the control unit 51 can be, for example, a DRAM, a flash memory, an EEPROM or an EPROM. If the control unit 51 is wirelessly coupled to the sensing element 52 and the removal unit 53, the control unit 51 can be a server or a cloud computing system.

The control unit 51 can control the removal unit 53 to partially remove a first layer of the workpiece 3 with a predetermined first removal depth (starting from the surface of the workpiece 3) according to the stable operating condition plot, as described at step S202 or steps S402 and S403. If no chatter is sensed, the removal operation is completed. Otherwise, if a chatter is sensed by the sensing element 52, the control unit 51 controls the removal unit 53 to continue removal of the first layer of the workpiece 3 with a second removal depth that is less than the predetermined first removal depth; if a chatter is sensed again, the removal depth is reduced again, and the removal operation and the sensing operation are continued until removal of the first layer is completed, as described at step S203 or in the processes after a chatter is sensed at step S404. Further, if the workpiece has at least two layers to be removed in addition to a last layer, the difference between the predetermined first removal depth of the first layer and the second removal depth of the first layer can be required to be less than or equal to the sum of the predetermined first removal depth of the first layer and the predetermined first removal depth of the second layer multiplied by 0.04, which is represented as expression (1).

Then, the control unit 51 determines a minimum removal depth according to the removal operation, and controls the removal unit 53 to remove the last layer of the workpiece 3 with a last removal depth that is less than or equal to the minimum removal depth so as to allow the workpiece 3 to have a target thickness, as described at step S204 or step S410.

If the workpiece 3 has a second layer (i.e., a layer between the second layer and the last layer), steps S202 and S203 or steps S402 to S405 are repeated to remove the second layer of the workpiece 3. At step S410, the control unit 51 determines the minimum removal depth according to the removal operation of the second layer.

If a chatter is sensed by the sensing element 52 and the workpiece 3 has a second layer, the control unit 51 can determine the result of subtracting the sum of the predetermined first removal depth of the first layer and the predetermined first removal depth of the second layer multiplied by 0.04 from the difference between the predetermined first removal depth of the first layer and the second removal depth of the first layer, as described at step S406.

If the difference between the predetermined first removal depth of the first layer and the second removal depth of the first layer is greater than the sum of the predetermined first removal depth of the first layer and the predetermined first removal depth of the second layer multiplied by 0.04 (i.e., it is determined that the maximum amount of reduction in the removal depth is reached at step S406), the control unit 51 controls the removal unit 53 to stop removal of the first layer, re-designs the number of layers from the second layer to the next-to-the-last layer and the predetermined first removal depth according to the stable operating condition plot, defines the predetermined first removal depth of the second layer to be less than or equal to the second removal depth of the first layer, and initiates removal of the second layer. That is, the control unit 51 controls the removal unit 53 to partially remove the second layer of the workpiece 3 with the first removal depth that is less than or equal to the second removal depth of the first layer. Then, if a chatter is sensed by the sensing element 52, the control unit 51 controls the removal unit 53 to partially remove the second layer with a second removal depth that is less than the predetermined first removal depth of the second layer. Further, if it is determined that the maximum amount of reduction in the removal depth is reached at step S406, the control unit 51 and the removal unit 53 can repeat the above-described processes so as to change the removal depth until no chatter occurs or removal of the next-to-the-last layer is completed. For example, steps S403, S404, S405 and S410 are performed or step S406 is performed when a chatter is sensed.

If the difference between the predetermined first removal depth of the first layer and the second removal depth of the first layer is less than or equal to the sum of the predetermined first removal depth of the first layer and the predetermined first removal depth of the second layer multiplied by 0.04 and a chatter is sensed by the sensing element 52, the control unit 51 controls the removal unit 53 to partially remove the first layer of the workpiece with a second removal depth that is less than the predetermined first removal depth of the first layer. Further, if the workpiece has at least two layers to be removed in addition to the last layer, the difference between the predetermined first removal depth of the first layer and the second removal depth of the first layer can be required to be less than or equal to the sum of the predetermined first removal depth of the first layer and the predetermined first removal depth of the second layer multiplied by 0.04, which is represented as expression (1). If a chatter occurs continuously, the removal depth is continuously reduced, and the first layer of the workpiece 3 is partially removed with an Nth removal depth corresponding to the minimum removal depth of the first layer until removal of the first layer is completed, as described at step S407.

The control unit 51 further determines the result of subtracting the sum of the predetermined first removal depth of the first layer and the predetermined first removal depth of the second layer multiplied by 0.04 from the difference between the predetermined first removal depth of the first layer and the Nth removal depth of the first layer, as described at step S408.

If the difference between the predetermined first removal depth of the first layer and the Nth removal depth of the first layer is less than the sum of the predetermined first removal depth of the first layer and the predetermined first removal depth of the second layer multiplied by 0.04 (i.e., it is determined that the maximum amount of reduction in the removal depth is not reached at step S408), the control unit 51 controls the removal unit 53 to partially remove the workpiece 3 with the Nth removal depth of the first layer. If no chatter occurs, the workpiece 3 is partially removed with the Nth removal depth until the next-to-the-last layer of the workpiece 3 is removed.

If the difference between the predetermined first removal depth of the first layer and the Nth removal depth of the first layer is greater than or equal to the sum of the predetermined first removal depth of the first layer and the predetermined first removal depth of the second layer multiplied by 0.04, the control unit 51 defines the difference between the predetermined first removal depth of the first layer and the sum of the predetermined first removal depth of the first layer and the predetermined first removal depth of the second layer multiplied by 0.04 as a temporary removal depth and controls the removal unit 53 to partially remove the workpiece 3 with the temporary removal depth, as described at step S409.

Further, when the workpiece 3 is partially removed with the temporary removal depth and a chatter is sensed, the control unit 51 and the removal unit 53 can repeat steps S403, S404, S406, S407, S408 and S409, or steps 403, S404, S406 and S402, or steps S403, S404, S406, S407, S408 and S403. When the workpiece 3 is partially removed with the Nth removal depth of the first layer and a chatter is sensed, the control unit 51 and the removal unit 53 can repeat steps S403, S404, S406, S407 and S408, or steps S403, S404, S406 and S402, or steps S403, S404, S405 and S403 until step S410 is reached.

According to the present disclosure, when a chatter is sensed during partial removal of a workpiece, the removal depth is reduced to prevent the chatter from continuously occurring without requiring a shut-down. Further, the last layer of the workpiece is removed with a last removal depth that is less than or equal to the minimum removal depth of the previous layers so as to ensure no chatter occurs and allow previous defects to be removed. Furthermore, the present disclosure limits the amount of reduction in the removal depth so as to avoid cutter breakage and maintain a desired removal rate and hence maintain a desired production rate.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of the present disclosure defined by the appended claims.

What is claimed is:

1. A method for chatter avoidance, comprising steps of:
   a) providing a stable operating condition plot with a safe removal depth and a condition of a removal tool;
   b) performing a first part of a removal operation to partially remove a first layer of a workpiece with a predetermined first removal depth of the first layer according to the safe removal depth of the stable operating condition plot, and performing a sensing operation to sense a chatter caused by the removal operation;
   c) if no chatter is sensed, completing the removal operation; or if a chatter is sensed, continuing to partially remove the first layer of the workpiece with a second removal depth of the first layer less than the predetermined first removal depth of the first layer and sensing a chatter caused by the removal operation, and if a chatter is sensed again, reducing the second removal depth of the first layer and continuing the removal operation and the sensing operation until the first layer of the workpiece is completely removed;
   d) determining a minimum removal depth of the first layer according to the removal operation of the first layer in step c); and
   e) removing a last layer of the workpiece with a last removal depth less than or equal to the minimum removal depth, allowing the workpiece to have a target thickness.

2. The method of claim 1, after step d), further comprising:
   b1) performing a second part of the removal operation to partially remove a second layer of the workpiece with a predetermined first removal depth of the second layer, and performing a sensing operation to sense a chatter caused by the removal operation;
   c1) if no chatter is sensed, completing the removal operation; or if a chatter is sensed, continuing to partially remove the second layer of the workpiece with a second removal depth of the second layer and sensing a chatter caused by the removal operation, and if a chatter is sensed again, reducing the second removal depth of the second layer and continuing the removal operation and the sensing operation until the second layer of the workpiece is completely removed; and d1) determining a minimum removal depth of the second layer according to the removal operation of the second layer in step c1), wherein the minimum removal depth in step e) is the minimum removal depth of the second layer.

3. The method of claim 2, wherein a difference between the predetermined first removal depth of the first layer and the second removal depth of the first layer is greater than a sum of the predetermined first removal depth of the first layer and the predetermined first removal depth of the second layer multiplied by 0.04.

4. The method of claim 3, further comprising initiating step c1) to remove the second layer of the workpiece, wherein the predetermined first removal depth of the second layer is less than or equal to the minimum removal depth of the first layer.

5. The method of claim 4, further comprising re-designing an operating path between the first layer and the last layer before initiating the step c1) to remove the second layer of the workpiece.

6. The method of claim 2, wherein a difference between the predetermined first removal depth of the first layer and the second removal depth of the first layer is less than or equal to a sum of the predetermined first removal depth of the first layer and the predetermined first removal depth of the second layer multiplied by 0.04.

7. The method of claim 6, wherein when a chatter is sensed, the step c) further comprises continuously reducing the second removal depth of the first layer, partially removing the workpiece with an Nth removal depth of the first layer corresponding to the minimum removal depth of the first layer, and continuously sensing a chatter caused by the removal operation until the first layer is completely removed.

8. The method of claim 7, wherein a difference between the predetermined first removal depth of the first layer and the Nth removal depth of the first layer is less than the sum of the predetermined first removal depth of the first layer and the predetermined first removal depth of the second layer multiplied by 0.04, and the step c) further comprises partially removing the first layer of the workpiece with the Nth removal depth of the first layer and sensing a chatter caused by the removal operation; if no chatter is sensed, partially removing the workpiece with the Nth removal depth of the first layer until a next-to-the-last layer of the workpiece is removed.

9. The method of claim 7, wherein a difference between the predetermined first removal depth of the first layer and the Nth removal depth of the first layer is greater than or equal to the sum of the predetermined first removal depth of the first layer and the predetermined first removal depth of the second layer multiplied by 0.04, and the step c) further comprises defining a difference between the predetermined first removal depth of the first layer and the sum of the predetermined first removal depth of the first layer and the predetermined first removal depth of the second layer multiplied by 0.04 as a temporary removal depth, partially removing the workpiece with the temporary removal depth, and sensing a chatter caused by the removal operation.

10. The method of claim 1, wherein the condition of the removal tool refers to a rotating speed of a shaft of the removal tool, a feeding speed, a condition of a cutter, or any combination thereof.

11. A device for chatter avoidance, comprising:
a removal unit configured to partially remove a workpiece;
a sensing element configured to sense a chatter when the workpiece is partially removed;
a control unit coupled to the removal unit and the sensing element, and configured to receive a chatter signal from the sensing element and control the removal unit according to the chatter signal,
wherein according to a stable operating condition plot with a safe removal depth and a condition of a removal tool, the control unit is further configured to perform steps of:
a) subjecting the removal unit to perform a first part of a removal operation to partially remove a first layer of the workpiece with a predetermined first removal depth of the first layer according to the safe removal depth of the stable operating condition plot, and subjecting the sensing element to perform a sensing operation to sense a chatter caused by the removal operation;
b) if no chatter is sensed, subjecting the removal unit to complete the removal operation; or if a chatter is sensed by the sensing operation of the sensing element, subjecting the removal unit to continue partially removing the first layer of the workpiece with a second removal depth of the first layer less than the predetermined first removal depth of the first layer and subjecting the sensing element to sense a chatter caused by the removal operation, and if a chatter is sensed again, reducing the second removal depth of the first layer and subjecting the removal unit to continue the removal operation and the sensing operation until the first layer of the workpiece is completely removed; and
c) determining a minimum removal depth of the first layer according to the removal operation of the first layer in step b);
d) subjecting the removal unit to remove a last layer of the workpiece with a last removal depth less than or equal to the minimum removal depth, allowing the workpiece to have a target thickness.

12. The device of claim 11, wherein after step c), the control unit is further configured to perform steps of:
a1) subjecting the removal unit to perform a second part of the removal operation to partially remove a second layer of the workpiece with a predetermined first removal depth of the second layer, and subjecting the sensing element to perform a sensing operation to sense a chatter caused by the removal operation;
b1) if no chatter is sensed, subjecting the removal unit to complete the removal operation; or if a chatter is sensed by the sensing operation of the sensing element, subjecting the removal unit to continue partially removing the second layer of the workpiece with a second removal depth of the second layer and subjecting the sensing element to sense a chatter caused by the removal operation, and if a chatter is sensed again, reducing the second removal depth of the second layer and subjecting the removal unit to continue the removal operation and the sensing operation until the second layer of the workpiece is completely removed; and
c1) determining a minimum removal depth of the second layer according to the removal operation of the second layer in step b1),
wherein the minimum removal depth in step d) is the minimum removal depth of the second layer.

13. The device of claim 12, wherein the control unit is further configured to determine a difference between the predetermined first removal depth of the first layer and the second removal depth of the first layer and a sum of the predetermined first removal depth of the first layer and the predetermined first removal depth of the second layer multiplied by 0.04.

14. The device of claim 13, wherein if the difference between the predetermined first removal depth of the first layer and the second removal depth of the first layer is greater than the sum of the predetermined first removal depth of the first layer and the predetermined first removal depth of the second layer multiplied by 0.04, the control unit is further configured to initiate step b1).

15. The device of claim 14, wherein the predetermined first removal depth of the second layer is less than or equal to the minimum removal depth of the first layer.

16. The device of claim 15, wherein before initiating the step b1), the control unit is further configured to re-design an operating path between the first layer and the last layer.

17. The device of claim 13, wherein if the difference between the predetermined first removal depth of the first layer and the second removal depth of the first layer is less than or equal to the sum of the predetermined first removal depth of the first layer and the predetermined first removal depth of the second layer multiplied by 0.04, the control unit is further configured to subject the removal unit to continuously reduce the second removal depth when a chatter is sensed and partially remove the workpiece with an Nth removal depth of the first layer corresponding to the minimum removal depth of the first layer until the first layer is completely removed.

18. The device of claim 17, wherein a difference between the predetermined first removal depth of the first layer and the Nth removal depth of the first layer is less than the sum of the predetermined first removal depth of the first layer and the predetermined first removal depth of the second layer multiplied by 0.04, and the control unit is further configured to subject the removal unit to partially remove the workpiece with the Nth removal depth of the first layer and subject the sensing element to sense a chatter caused by the removal operation; if no chatter is sensed, the removal unit is further configured to partially remove the workpiece with the Nth removal depth until a next-to-the-last layer of the workpiece is removed.

19. The device of claim 17, wherein a difference between the predetermined first removal depth of the first layer and the Nth removal depth of the first layer is greater than or equal to the sum of the predetermined first removal depth of the first layer and the predetermined first removal depth of the second layer multiplied by 0.04, and the control unit is further configured to define a difference between the predetermined first removal depth of the first layer and the sum of the predetermined first removal depth of the first layer and the predetermined first removal depth of the second layer multiplied by 0.04 as a temporary removal depth, and subject the removal unit to partially remove the workpiece with the temporary removal depth.

20. The device of claim 11, wherein the condition of the removal tool refers to a rotating speed of a shaft of the removal tool, a feeding speed, a condition of a cutter, or any combination thereof.

* * * * *